(12) United States Patent
Schwaiger et al.

(10) Patent No.: US 10,173,302 B2
(45) Date of Patent: *Jan. 8, 2019

(54) PORTABLE WORK HOLDING DEVICE AND ASSEMBLY

(71) Applicant: JPW Industries Inc., La Vergne, TN (US)

(72) Inventors: Barry M. Schwaiger, Murfreesboro, TN (US); Charles Weber, Onalaska, WI (US); Timothy Scott Onello, Murfreesboro, TN (US)

(73) Assignee: JPW Industries Inc., LaVergne, TN (US)

( * ) Notice: Subject to any disclaimer, the term of this patent is extended or adjusted under 35 U.S.C. 154(b) by 702 days.

This patent is subject to a terminal disclaimer.

(21) Appl. No.: 14/281,401

(22) Filed: May 19, 2014

(65) Prior Publication Data

US 2014/0346725 A1 Nov. 27, 2014

Related U.S. Application Data

(60) Provisional application No. 61/826,818, filed on May 23, 2013.

(51) Int. Cl.
*B23Q 3/02* (2006.01)
*B25B 1/24* (2006.01)
*B60R 11/00* (2006.01)
*B25B 1/10* (2006.01)
*B60R 11/06* (2006.01)

(52) U.S. Cl.
CPC ............ *B25B 1/2484* (2013.01); *B25B 1/103* (2013.01); *B25B 1/24* (2013.01); *B25B 1/2489* (2013.01); *B60R 11/00* (2013.01); *B60R 11/06* (2013.01); *B60R 2011/004* (2013.01); *B60R 2011/005* (2013.01); *B60R 2011/0071* (2013.01)

(58) Field of Classification Search
USPC ........................................................ 269/100
See application file for complete search history.

(56) References Cited

U.S. PATENT DOCUMENTS

| 196,380 | A | | 10/1877 | Parker | |
|---|---|---|---|---|---|
| 3,206,224 | A | * | 9/1965 | Bock | B60D 1/345 280/406.2 |
| 4,040,613 | A | * | 8/1977 | Kartasuk | B25B 1/103 269/247 |
| D282,143 | S | * | 1/1986 | Tarquinio | D8/74 |
| 4,659,102 | A | * | 4/1987 | Stuhrmann | B62D 49/085 172/275 |
| 4,807,863 | A | * | 2/1989 | Yang | B25B 1/103 269/153 |

(Continued)

*Primary Examiner* — Joseph J Hail
*Assistant Examiner* — Brian D Keller
(74) *Attorney, Agent, or Firm* — Waller Lansden Dortch & Davis, LLP; Blake M. Bernard

(57) ABSTRACT

A work holding device, such as a vice, includes first and second jaws and a spindle connected between them to change the distance between the jaws for holding a work piece. An elongated connection member extends from the first jaw and is shaped to fit into a receiver member of a receiver hitch on a vehicle. Adjustable projections are provided on the elongated connection member for reducing movement of the vice in the hitch. The adjustable projections may be set screws. An end cap is provided on the end of the elongated connection member. The work holding device may be mounted in a receiver member or bracket on a workbench or other work area.

14 Claims, 9 Drawing Sheets

(56) References Cited

U.S. PATENT DOCUMENTS

| | | | | |
|---|---|---|---|---|
| 4,885,453 A * | 12/1989 | Martin | B23K 9/1336 | |
| | | | 219/136 | |
| 4,971,301 A * | 11/1990 | Yang | B25B 1/2436 | |
| | | | 269/153 | |
| 5,433,356 A * | 7/1995 | Russell | B25B 1/24 | |
| | | | 224/519 | |
| 5,522,287 A | 6/1996 | Chiang | | |
| 5,527,146 A * | 6/1996 | Allsop | B60R 9/06 | |
| | | | 224/319 | |
| 5,658,119 A * | 8/1997 | Allsop | B60R 9/10 | |
| | | | 224/536 | |
| 5,803,941 A * | 9/1998 | Berkhoel | B01D 46/0004 | |
| | | | 55/498 | |
| 5,881,937 A * | 3/1999 | Sadler | B60R 9/065 | |
| | | | 224/509 | |
| 5,950,617 A * | 9/1999 | Lorenz | B60R 9/06 | |
| | | | 108/44 | |
| 6,135,435 A * | 10/2000 | Schmitz | B25B 1/103 | |
| | | | 269/164 | |
| 7,017,898 B2 * | 3/2006 | Varzino | B25B 1/22 | |
| | | | 269/246 | |
| 7,036,807 B1 * | 5/2006 | Gasparyan | B25B 1/125 | |
| | | | 269/181 | |
| 7,673,861 B2 * | 3/2010 | Meholovitch | B25B 1/125 | |
| | | | 269/179 | |
| 7,775,530 B2 * | 8/2010 | Darling, III | A61G 1/013 | |
| | | | 280/47.18 | |
| D652,703 S * | 1/2012 | Onello | D8/77 | |
| 8,109,494 B1 * | 2/2012 | Warth | B25B 1/125 | |
| | | | 269/136 | |
| D680,843 S * | 4/2013 | Onello | D8/74 | |
| D707,096 S * | 6/2014 | Zhang | D8/74 | |
| 2003/0201290 A1 * | 10/2003 | Clausen | B60R 9/12 | |
| | | | 224/519 | |
| 2006/0049566 A1 * | 3/2006 | Bernstein | B25B 1/103 | |
| | | | 269/43 | |
| 2007/0181624 A1 * | 8/2007 | Smith | B60R 9/00 | |
| | | | 224/519 | |
| 2010/0072240 A1 * | 3/2010 | Cornes | B25B 1/103 | |
| | | | 224/536 | |
| 2010/0283225 A1 * | 11/2010 | Lahn | B60D 1/06 | |
| | | | 280/506 | |
| 2010/0320666 A1 * | 12/2010 | Teo | B25B 1/103 | |
| | | | 269/43 | |
| 2012/0043711 A1 * | 2/2012 | Schmidt | B25B 1/103 | |
| | | | 269/136 | |
| 2013/0127104 A1 * | 5/2013 | Onello | B25B 1/103 | |
| | | | 269/99 | |

* cited by examiner

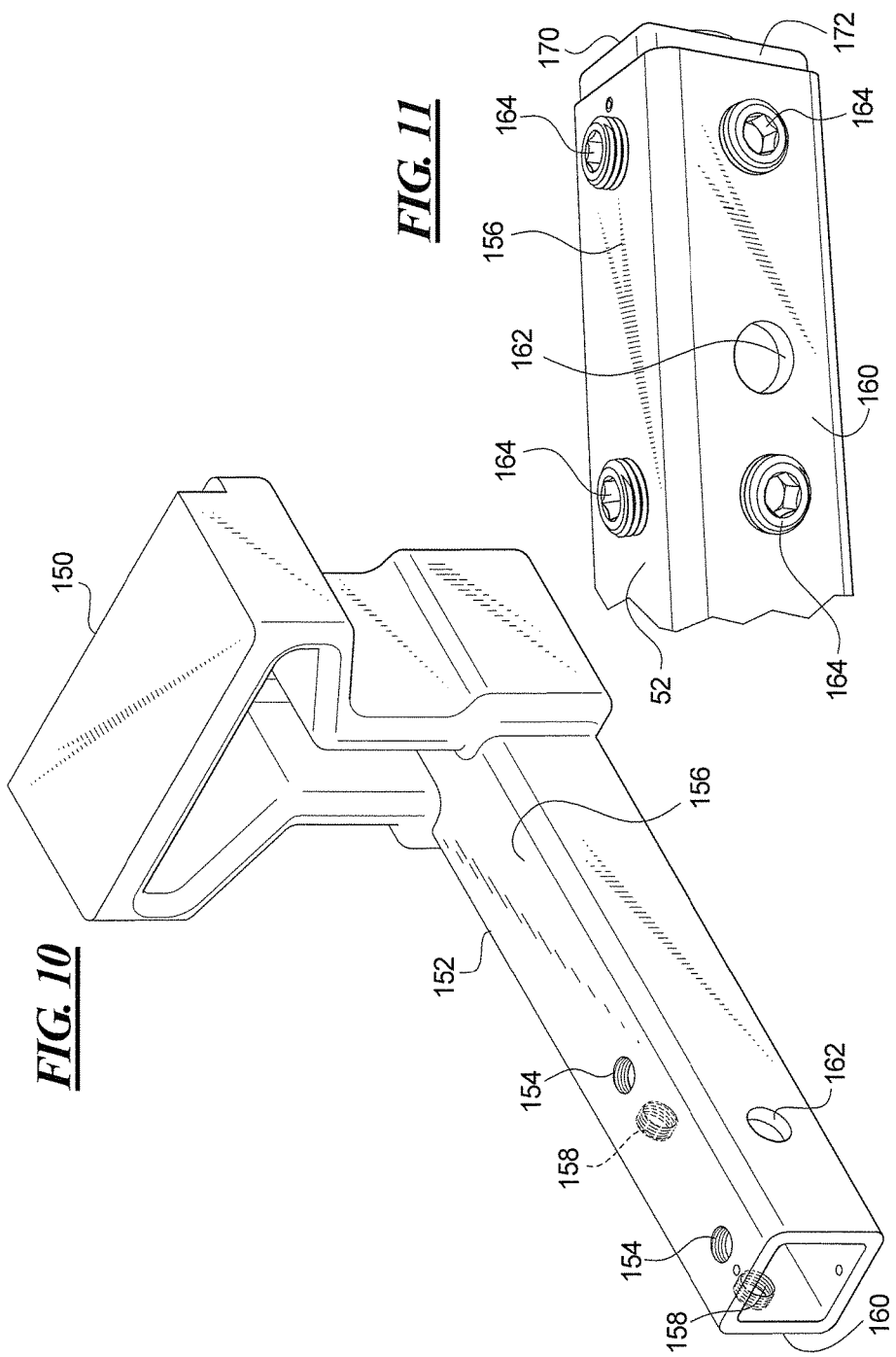

PORTABLE WORK HOLDING DEVICE AND ASSEMBLY

CROSS-REFERENCE TO RELATED APPLICATION

This application claims the benefit of U.S. Provisional Patent Application Ser. No. 61/826,818, filed May 23, 2013, which is incorporated herein by reference.

BACKGROUND OF THE INVENTION

Field of the Invention

The subject matter disclosed herein relates generally to a work holding device, such as a vice or clamp, and, more particularly, to a portable work holding device configured to be removably mounted to a support, for example, a receiver hitch of a vehicle or a receiver or bracket on a support surface, such as a table or work bench.

Description of the Related Art

Bench vices are useful tools that are commonly used by workers and craftspersons. The bench vice is attached to a workbench where it provides a stable way to hold a work piece or other article. Attempts have been made in the past to attach a vise to work trucks or vehicles by taking an existing bench vise and mounting the bench vice to a platform or a pad on the vehicle. The platform or pad for attaching the vice on the vehicle may be less stable than is desired while working with the vice. The platform or pad may be in the way while seeking to carry materials and tools in the vehicle or while working out of the vehicle. While a vice which has been fastened to the platform or pad provides a portable work holding device, the additional size and weight of the vice with the platform may limit the portability of the conventional bench vise such that it is heavy and difficult to transport. Other attempts to make work holding devices more portable have resulted in a work holding device that is not as strong as a bench vice and so compromise the work holding capabilities of the work holding device. In both of these cases, an undesirable tradeoff is made for either portability or for function.

A portable work holding device has been developed that may be mounted in a receiver hitch on a vehicle to provide a stable and strong mount for the work holding device. Receiver portions of receiver hitches vary somewhat in size and shape so that the work holding device may not fit snuggly in the receiver hitch and so may rattle or be subject to movement. Some receiver portions of receiver hitches have an open end opposite the receiver opening, permitting moisture, dirt and debris to enter the receiver portion, and subjecting a hitch mounted work holding device to the moisture, dirt and debris which may enter the internal workings of the work holding device.

SUMMARY OF THE INVENTION

In one aspect, a work holding device includes an elongated connection member for connecting the work holding device to a support, such as a receiver portion of a receiver hitch on a vehicle or to a stationary receiver portion such as a work bench, wherein the elongated connection member includes at least one adjustable projection for stabilizing the work holding device in the receiver portion.

In another aspect, the work holding device includes an elongated connection member for connecting the work holding device to a support, such as a receiver portion of a receiver hitch on a vehicle or to a stationary receiver portion, wherein the elongated connection member includes a plurality of adjustable projections for stabilizing the work holding device in the receiver portion.

In yet another aspect, the work holding device includes an elongated connection member for connecting the work holding device to a support, such as a receiver portion of a receiver hitch on a vehicle or to a stationary receiver portion, wherein the elongated connection member includes an end cap.

The work holding device, in some embodiments, may include a first jaw piece having a first elongated connection member that defines a first passage. A second jaw piece has an elongated second connection member positionable within the first passage. The second connection member defines a second passage in communication with the first passage. A spindle assembly movably connects the second jaw piece to the first jaw piece. The spindle assembly is configured to move the second jaw piece with respect to the first jaw piece to create a clamping pressure when an object is placed between the first jaw piece and the second jaw piece.

In some embodiments, the portable work holding device includes a stationary first jaw piece having a casting and an elongated first connection member extending from the casting. The first connection member defines a first passage. A movable second jaw piece has an elongated second connection member extending from the second jaw piece. The second connection member is positionable within the first passage to couple the second jaw piece to the first jaw piece. The second connection member defines a second passage in communication with the first passage with the second connection member positioned within the first passage. A spindle assembly movably couples the second jaw piece to the first jaw piece. The spindle assembly includes a spindle nut positioned within at least the first passage. The spindle nut forms a helical thread on an inner surface of the spindle nut along at least a portion of a length of the spindle nut between a first end and a second end of the spindle nut. A spindle forms a helical thread on an outer surface of the spindle along at least a portion of a length of the spindle that cooperates with the helical thread formed on the inner surface of the spindle nut to facilitate translation of the second jaw piece with respect to the first jaw piece along an axis defined by the spindle.

In yet another embodiment, a portable work holding device assembly includes a work holding device and a plate assembly. The work holding device includes a first jaw piece having an elongated connection member for connecting the work holding device to a support, such as a receiver portion on a vehicle or on a work bench. The work holding device has a second jaw piece, and a spindle assembly movably connecting the second jaw piece to the first jaw piece. The spindle assembly includes a threaded spindle rotatable to move the second jaw piece with respect to the first jaw piece. The plate assembly includes a member having a plurality of walls defining a passage with a complementary cross-section to receive the first connection member. One or more brackets are coupled to a corresponding wall of the plurality of walls of the member. The one or more brackets each define one or more apertures to facilitate coupling the work holding device to a support surface.

In still another embodiment, a method of assembling a work holding device includes providing a stationary first jaw piece having a casting and an elongated first connection member extending from the casting, wherein the first connection member defines a first passage. An elongated second connection member of a movable second jaw piece is positioned within the first passage. The second connection member defines a second passage in communication with the first passage. A spindle assembly is positioned within the first passage and the second passage to movably couple the second jaw piece to the first jaw piece.

BRIEF DESCRIPTION OF THE DRAWINGS

FIG. 10 is a perspective view of a second embodiment of a work holding device;

FIG. 11 is an enlarged perspective view of an end portion of the vice shaft having set screws in the openings;

DETAILED DESCRIPTION OF THE PREFERRED EMBODIMENTS

Figure 1:
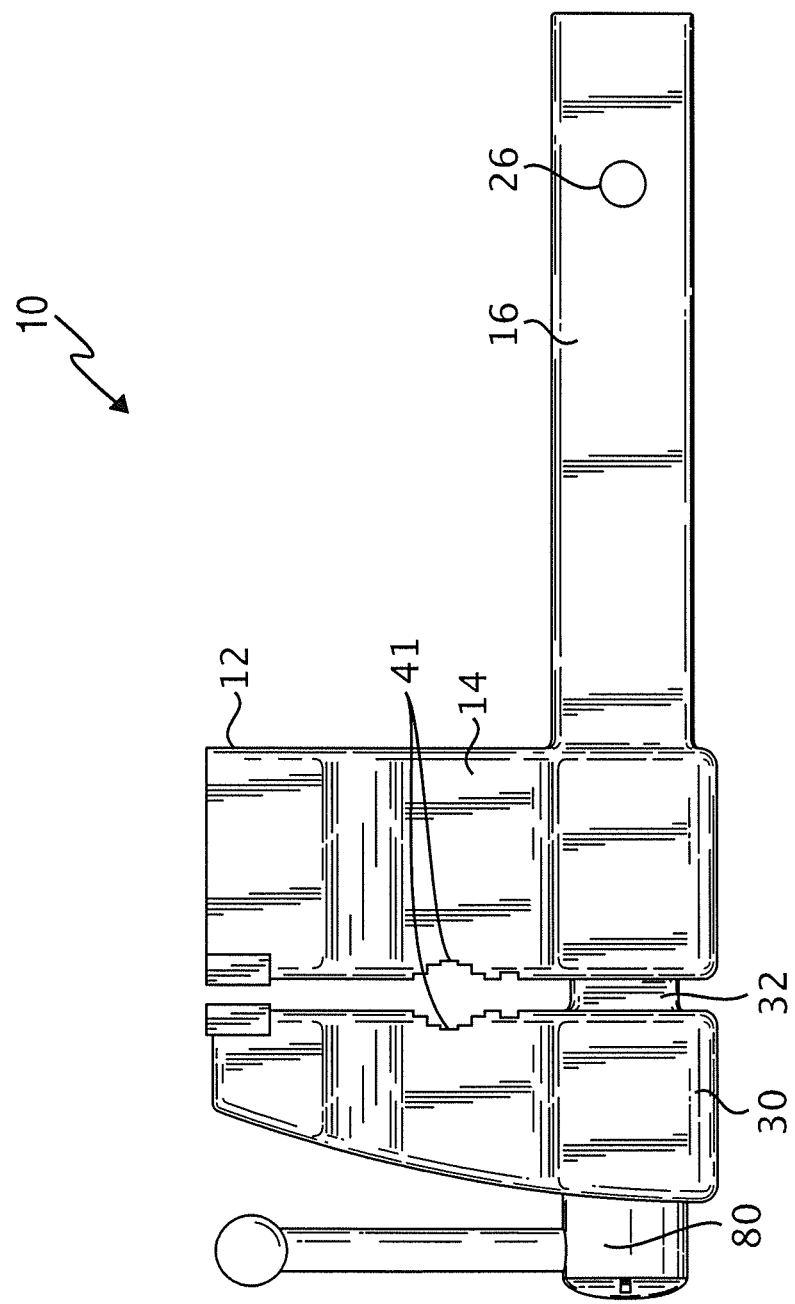
FIG. 1 is front plan view of an exemplary work holding device.

The embodiments described herein relate to a work holding device, such as a vice, that is capable of being quickly mounted to a vehicle using the receiver hitch of the vehicle as a connection point. The work holding device includes an elongated connection member that extends into the receiver portion of the receiver hitch. The elongated member includes at least one adjustable projection for selectively extending into contact with the receiver portion of the receiver hitch. The work holding device can instead be mounted to a bracket or other receiver member that is fixed to a suitable support surface, such as a table or a work bench, by inserting the elongated connection member of the work holding device into the bracket or other receiver member in the same manner as mounting the work holding device to the vehicle receiver hitch.

In one embodiment, the work holding device includes a fixed or stationary jaw piece, that includes a casting and the elongated connection member, and a movable jaw piece that is operatively connected to the stationary jaw piece by a spindle assembly that moves the movable jaw piece with respect to the stationary jaw piece to generate or create a pressure when an object is placed between the stationary jaw piece and the movable jaw piece. In one embodiment, the work holding device includes a handle having a single fixed arm that can be fixed or locked in a desired position, for example, in a twelve o'clock position, for storing the work holding device on the vehicle while the vehicle is being driven. In one embodiment, a recess is formed in the casting of the stationary jaw piece that allows for weight reduction, as well as a handle feature to facilitate portability. A work surface or an anvil is formed on at least the stationary jaw piece and is raised above the jaw pieces to create a more usable work surface while the work holding device is mounted to the vehicle.

An improvement of the work holding device provides one or more adjustable projections on the elongated connection member for adjusting the fit of the elongated connection member in the receiver member, as will be discussed herein after in conjunction with FIGS. 10-13. A further improvement which may be provided with the adjustable projections, or not, is a cap for closing an end of the elongated connection member.

Referring to FIGS. 1-9, in one embodiment a portable work holding assembly includes a work holding device, such as a vice, having a first jaw piece and an elongated first connection member for removably connecting the work holding device to a support, such as a vehicle receiver hitch or a support surface. A second jaw piece has an elongated second connection member that is positionable within a passage defined by the first connection member, and that defines a second passage in communication with the first passage. A spindle assembly is positioned within the first and second passages to movably couple the second jaw piece to the first jaw piece to facilitate translation of the second jaw piece with respect to the first jaw piece.

Figure 2:
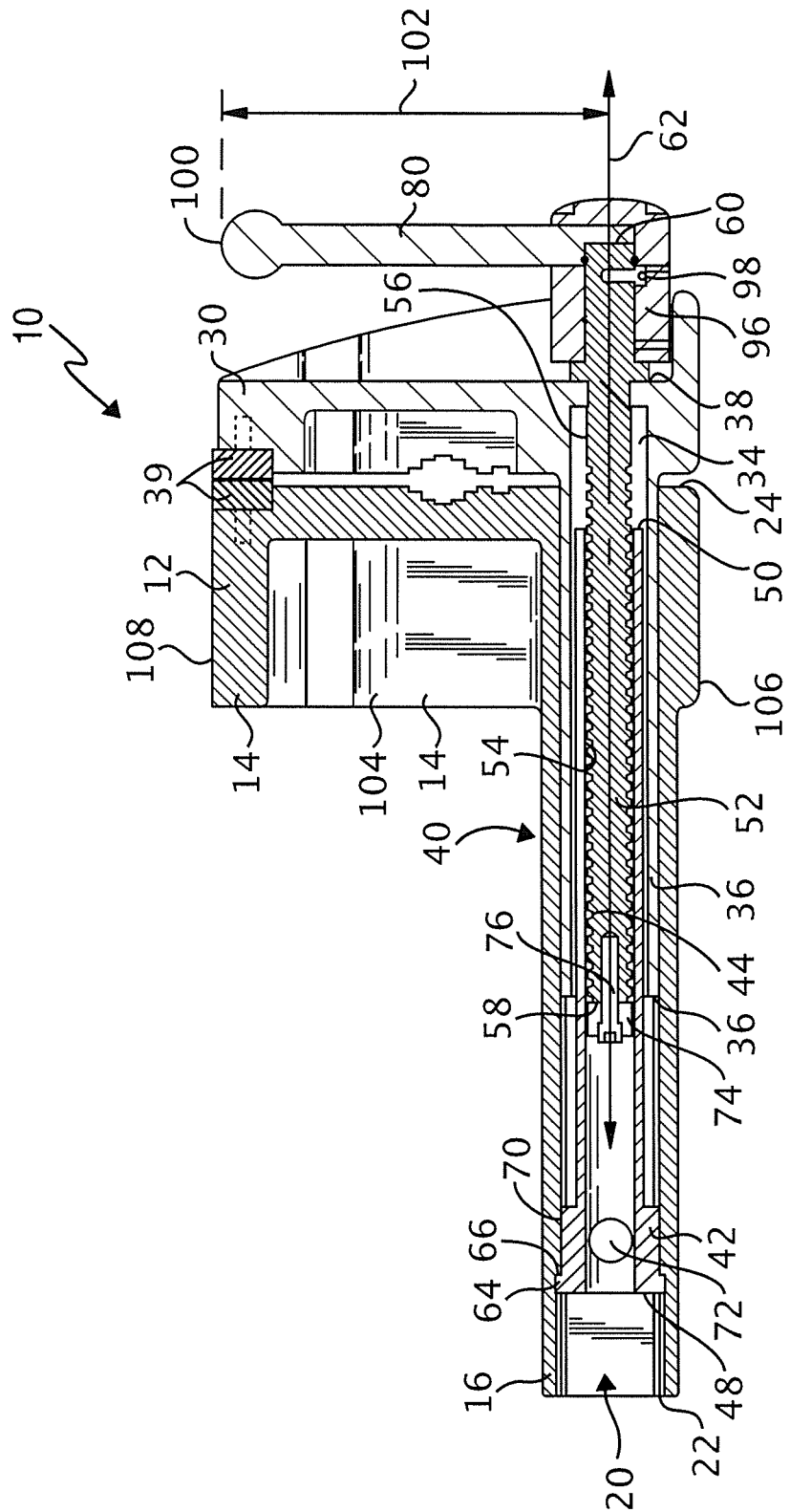
FIG. 2 is a cross-section view of the work holding device shown in FIG. 1.
Figure 7:
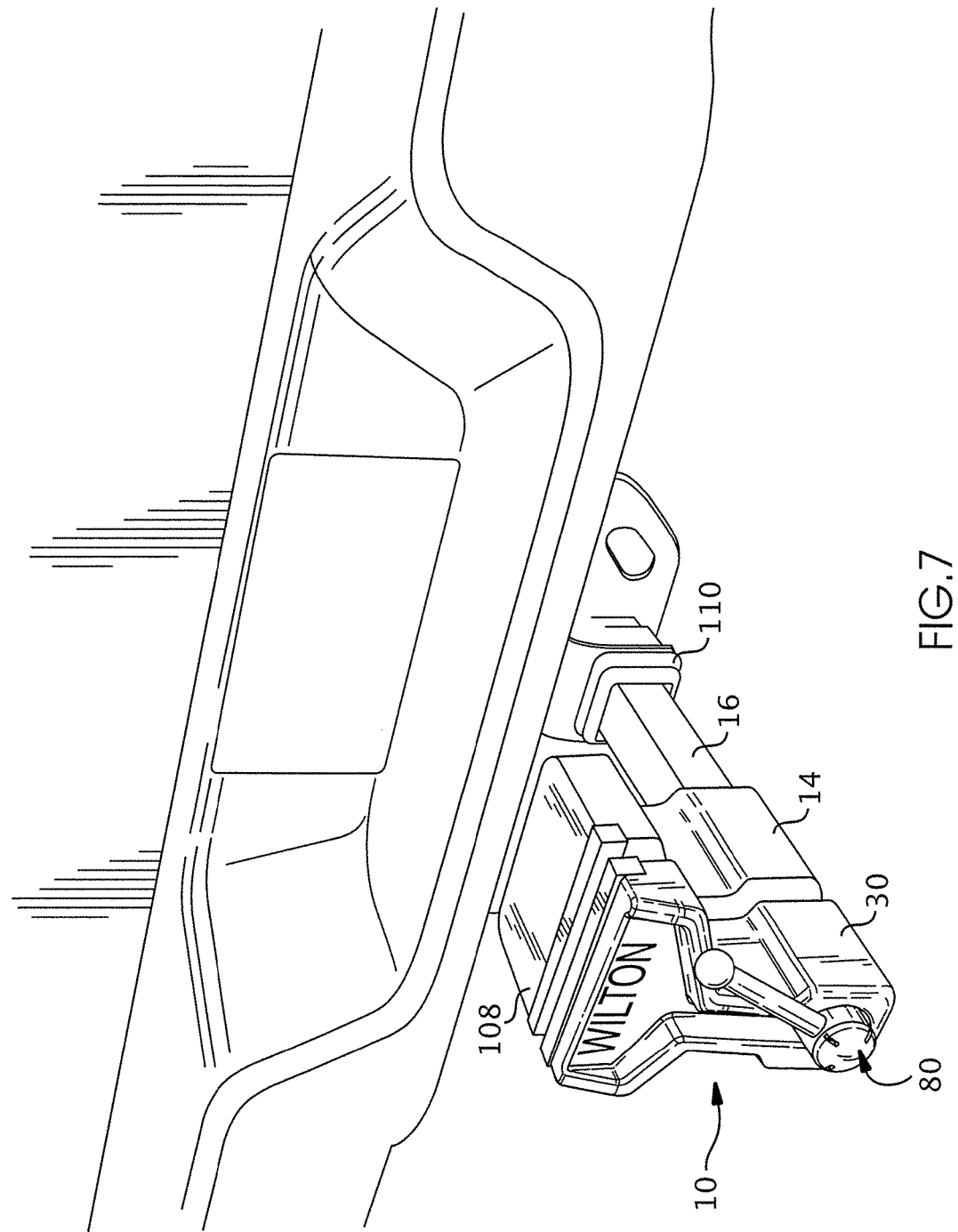
FIG. 7 is a perspective view of an exemplary work holding device coupled to a vehicle receiver hitch.
Figure 8:
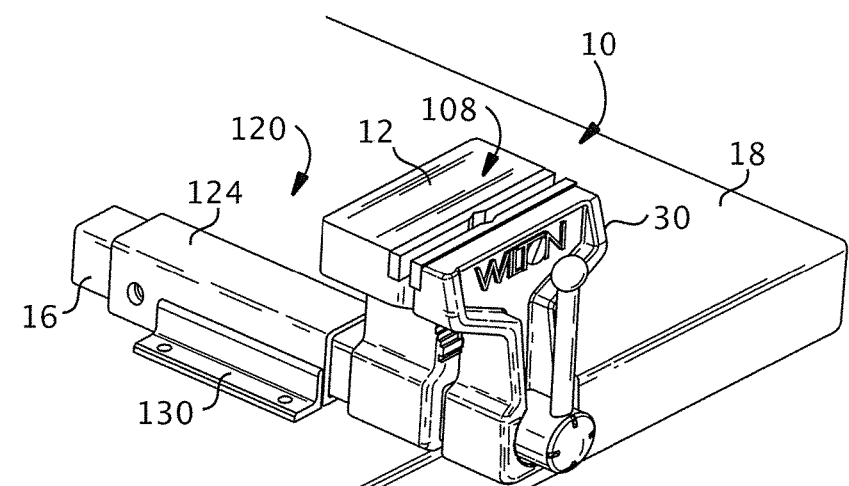
FIG. 8 is a perspective view of an exemplary work holding assembly coupled to a support, such as a work bench.
Figure 9:
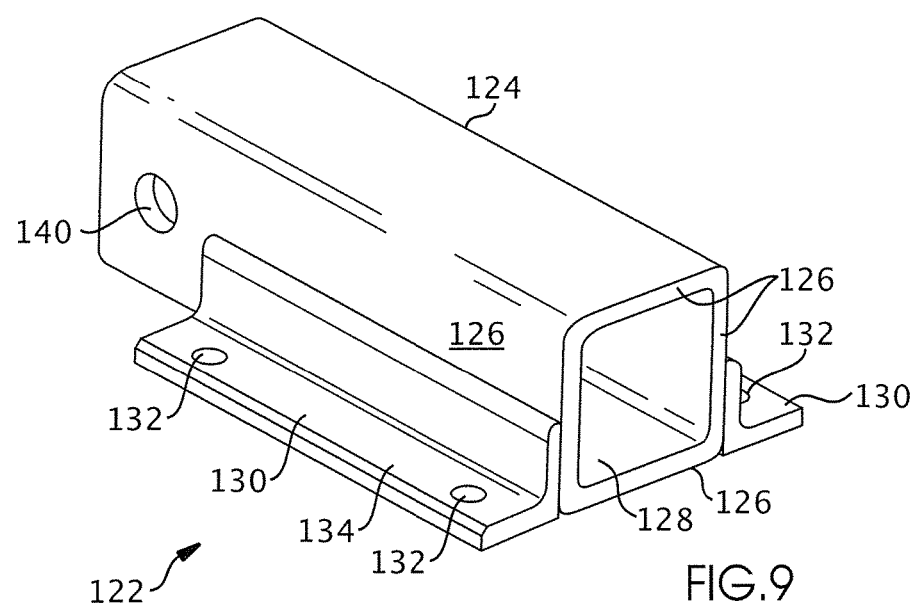
FIG. 9 is a perspective view of a plate assembly of the work holding assembly shown in FIG. 8.

Referring further to FIGS. 1 and 2, an exemplary portable work holding device 10, such as a vice, includes a stationary first jaw piece 12 having a casting 14 and an elongated first connection member 16 extending from a first end of casting 14 for connecting the work holding device 10 to a support 18 (shown in FIGS. 7 and 8, for example). The first connection member 16 defines a first passage 20, as shown in FIG. 2, that extends between a first end 22 and an opposing second end 24 of the first connection member 16. The first connection member 16 is configured to be inserted into and received within a receiver portion of a receiver hitch on a vehicle, as shown in FIG. 7, or a plate assembly or receiver portion for mounting on a surface, such as a table or workbench, as shown in FIGS. 8 and 9 and described in greater detail below. Referring to FIG. 1, an aperture 26 is defined through opposing lateral sides of the first connection member 16. With the work holding device 10 inserted into a vehicle receiver hitch, for example, a pin (not shown but which is well known) is removably positioned within aperture 26 to facilitate coupling work holding device 10 to the vehicle receiver hitch. In a particular embodiment, a nut (not shown) is coupled to first connection member 16, such as by one or more spot welds or another suitable method, and is threadedly engageable with the pin to fixedly couple the first jaw piece 12 to the vehicle receiver hitch.

A movable second jaw piece 30 includes an elongated second connection member 32 extending from a first end of second jaw piece 30. The second connection member 32 is positionable at least partially within first passage 20 to couple the second jaw piece 30 to the first jaw piece 12. As shown in FIG. 2, second connection member 32 defines a second passage 34 that extends between a first end 36 and an opposing second end 38. Second passage 34 is in communication with first passage 20 with second connection member 32 positioned within first passage 20. In one embodiment, a jaw member 39 made of a suitably durable and strong material, such as steel, is coupled to the first jaw piece 12 and/or the second jaw piece 30 and configured to secure an object placed between the first jaw piece 12 and the second jaw piece 30. In a particular embodiment, jaw member(s) 39 are removable and replaceable.

In one embodiment, the work holding device 10 includes a spindle assembly 40 movably connecting the second jaw piece 30 to the first jaw piece 12. The spindle assembly 40 is configured to move the second jaw piece 30 with respect to the first jaw piece 12 to create a clamping pressure on an object when the object is placed between the first jaw piece 12 and the second jaw piece 30. For example, a work piece, such as a pipe, may be positioned within the pipe jaws 41, and the spindle assembly 40 moves the second jaw piece 30 with respect to the first jaw piece 12 to provide a suitable clamping pressure to maintain the work piece properly positioned between the pipe jaws 41. In one embodiment, the pipe jaws 41 are stepped to receive different sized pipes or objects.

The spindle assembly 40 includes a spindle nut 42 positioned within at least a first passage 20. With the second connection member 32 positioned within the first connection member 16, the spindle nut 42 extends through the first passage 20 and into the second passage 34, as shown in FIG. 2. A helical thread 44 is formed on at least a portion of an inner surface 46 of the spindle nut 42 between a first end 48 and an opposing second end 50 of the spindle nut 42.

The spindle assembly 40 also includes a spindle 52 operatively coupled to the spindle nut 42. A complementary helical thread 54 is formed on at least a portion of an outer surface 56 of the spindle 52 along a length of spindle 52 between a first end 58 and an opposing second end 60 of spindle 52. Helical thread 54 cooperates with the helical thread 44 formed on the inner surface 46 of the spindle nut 42 to facilitate translation of the second jaw piece 30 with respect to the first jaw piece 12 along an axis 62 defined along a length of the spindle 52, as shown in FIG. 2. In one embodiment, the spindle assembly 40 forms a seal within the first passage 20 and the second passage 34 to prevent or limit debris, such as dust, from entering first passage 20 and/or second passage 34.

In one embodiment, the spindle nut 42 forms one or more tabs 64 at first end 48 that interfere with a shoulder or ledge 66 formed on an inner surface 68 of the first connection member 16 to prevent decoupling of the second jaw piece 30 from the first jaw piece 12. In the exemplary embodiment, a continuous, circumferential tab 64 is formed around an outer surface 70 of the spindle nut 42. In alternative embodiments one or more discontinuous tabs 64 are formed on outer surface 70 of the spindle nut 42. Further, as shown in FIG. 2, an aperture 72 defined through first end 48 of the spindle nut 42 aligns with the aperture 26 to retain the spindle nut 42 properly positioned within the first passage 20 and to facilitate coupling the work holding device 10 to a receiver with a pin positioned through the aperture 26 and the aperture 72.

In one embodiment, a stop block 74 is coupled to the first end 58 of the spindle 52. A stop block 74 is configured to allow the spindle 52 to move along the axis 62 within an intended travel range, while preventing the second jaw piece 30 from extending outside the intended travel range and decoupling from the first jaw piece 12. As shown in FIG. 2, a bolt 76 removably couples the stop block 74 to the first end 58 of the spindle 52. If the user needs to separate the second jaw piece 30 from the first jaw piece 12, the user, through the first end 22 of the first passage 20, can access the bolt 76 that holds the stop block 74 to remove the bolt 76 from the spindle nut 42. With the bolt 76 and the stop block 74 removed from within the first connection member 16, the spindle nut 42 can be removed from within the first connection member 16 to dissemble the spindle assembly 40.

Figure 3:
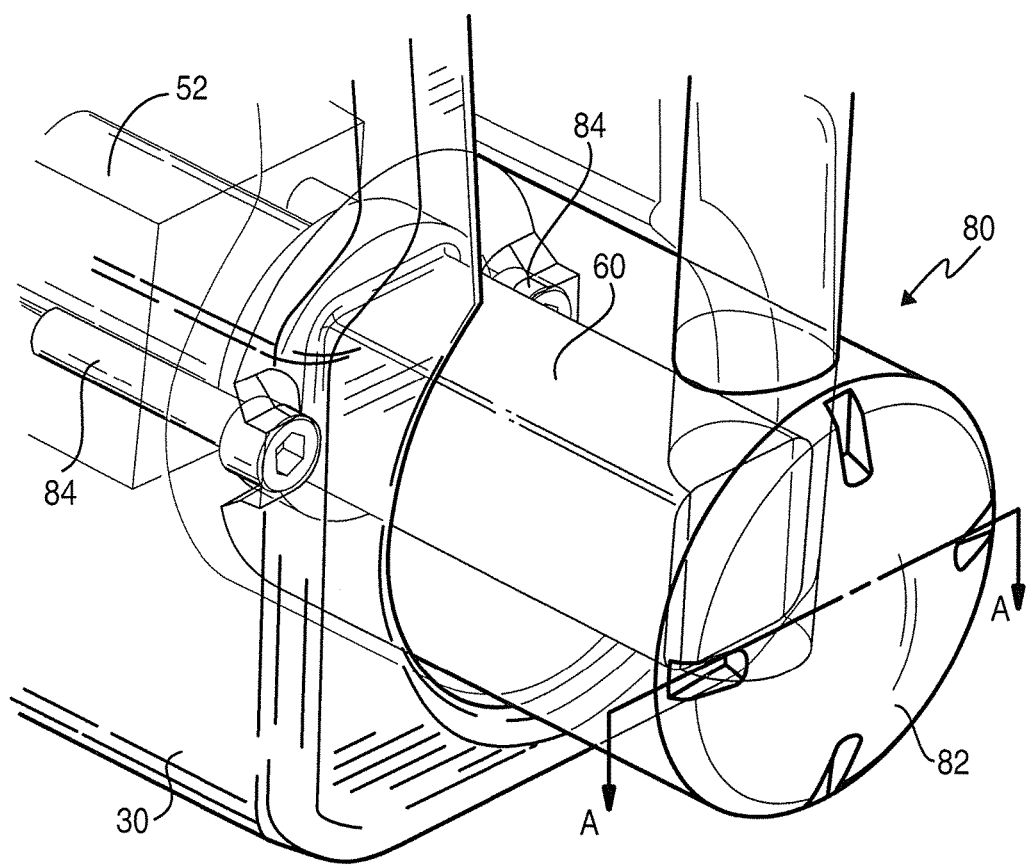
FIG. 3 is a perspective view of a portion of the work holding device shown in FIG. 1.
Figure 4:
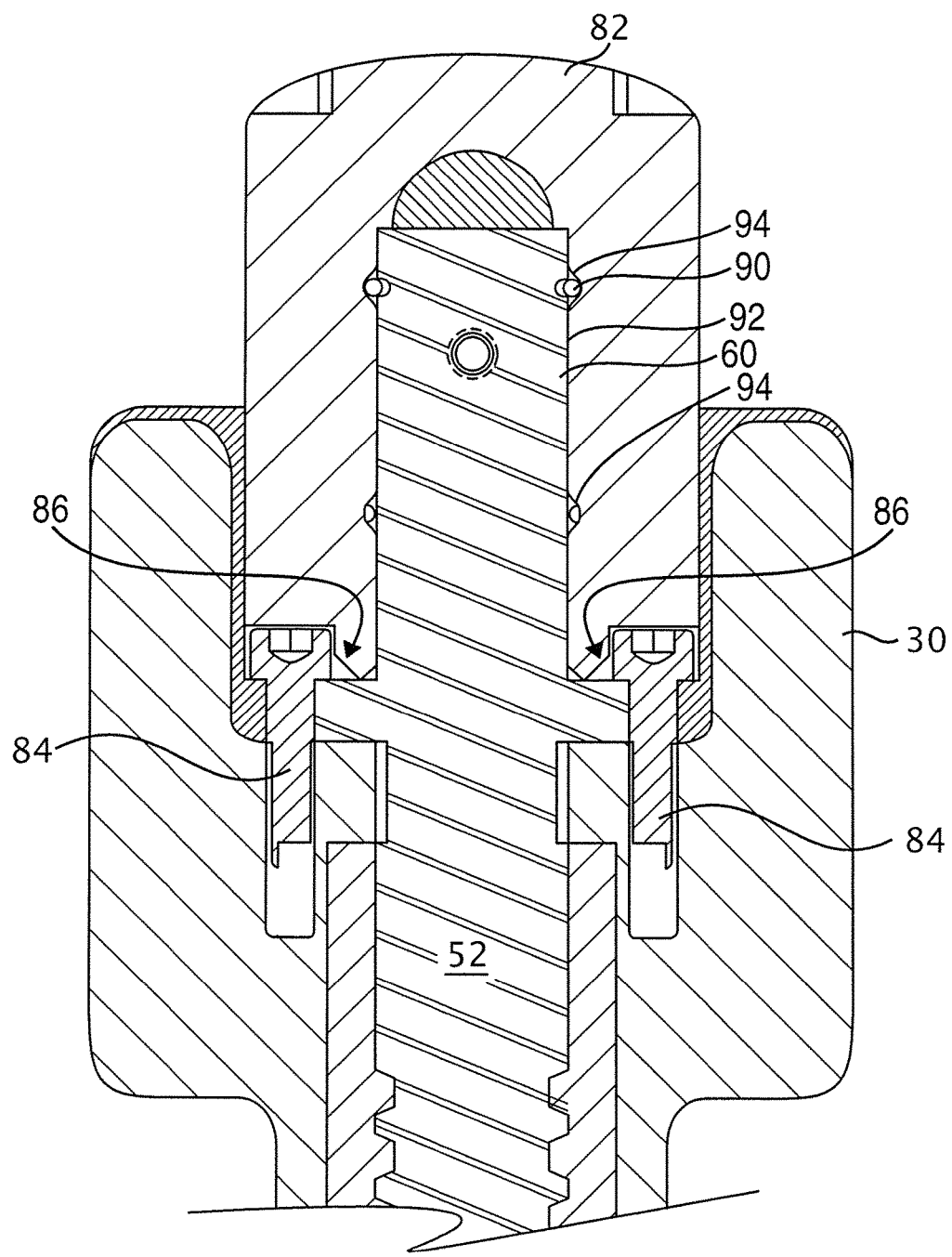
FIG. 4 is a cross-section view of the work holding device shown in FIG. 3 along sectional line A-A.

As shown in FIGS. 1 and 2, and further referring to FIGS. 3 and 4, the work holding device 10 includes a handle 80 operatively coupled to the spindle 52. In conventional bench-mounted vices, there is not a need for the handle to lock in a specific location; however, for use with a vehicle hitch receiver it is desirable for the handle 80 as described herein to be fixed in a locked position to protect the handle 80 from undesirable contact and/or damage, such as during vehicle travel. The handle 80 is configured to be fixed in a locked position to facilitate transporting the work holding device 10, such as when the work holding device 10 is coupled to a vehicle receiver hitch. The handle 80 is also configured to translate with respect to the spindle 52 along the axis 62 between a first position (away from second jaw piece 30) that allows the handle 80 to rotate about the axis 62 and a second position (toward the second jaw piece 30) that locks the handle 80 in the locked position, such as in a 12 o'clock position shown in FIG. 1, for example. As shown in FIGS. 3 and 4, the handle 80 includes a socket head 82 seated on one or more socket head cap screws 84 mounted to the second jaw piece 30 with the handle 80 in the locked position. The socket head 82 defines a chamfered pocket 86 that the socket head cap screws 84 self-center on as the handle 80 is urged toward the locked position.

In one embodiment, the second end 60 of the spindle 52 has a rectangular, such as a square, cross-section. The handle 80 defines a corresponding void 88 having a complementary cross-section to receive the second end 60 of the spindle 52 to facilitate translation of the handle 80 between the first position and the second position, and to facilitate a torque transfer when the handle 80 is rotated about the axis 62 in the first position. As shown in FIG. 4, a snap ring 90 is positioned about at least a portion of an outer surface 92 of the second end 60 of the spindle 52. The snap ring 90 is compressible when handle 80 is moved between the first position and the second position. The snap ring 90 expands into a corresponding pocket 94 of a plurality of pockets 94 formed within socket head 82 of the handle 80, with the handle 80 at one of the first position and the second position, to create a positive locating action to notify the user that the handle 80 is in the first position or the second position. Further, with the snap ring 90 positioned in one of corresponding pockets 94, the handle 80 is restricted or prevented from coming disengaged during vehicle travel.

In a further embodiment, the socket head 82 defines a void 96, as shown in FIG. 2. A suitably-sized socket head screw 98 extends into the void 96 to couple the spindle 52 to the socket head 82. The socket head screw 98 limits translation of the handle 80 along the spindle 52 between the first position wherein the socket head screw 98 contacts a first portion of a wall forming the void 96 and the second position wherein the socket head screw 98 contacts an opposing second portion of the wall forming void 96. In one embodiment, the handle 80 extends outwardly from the axis 62 to a fixed terminal point 100 at a distance 102 from the axis 62, as shown in FIG. 2. Unlike sliding handles on conventional bench-mounted vices, by fixing the handle 80 at a fixed terminal point 100 in the locked position, the handle 80 will not drop down and be at risk for damage.

Figure 5:
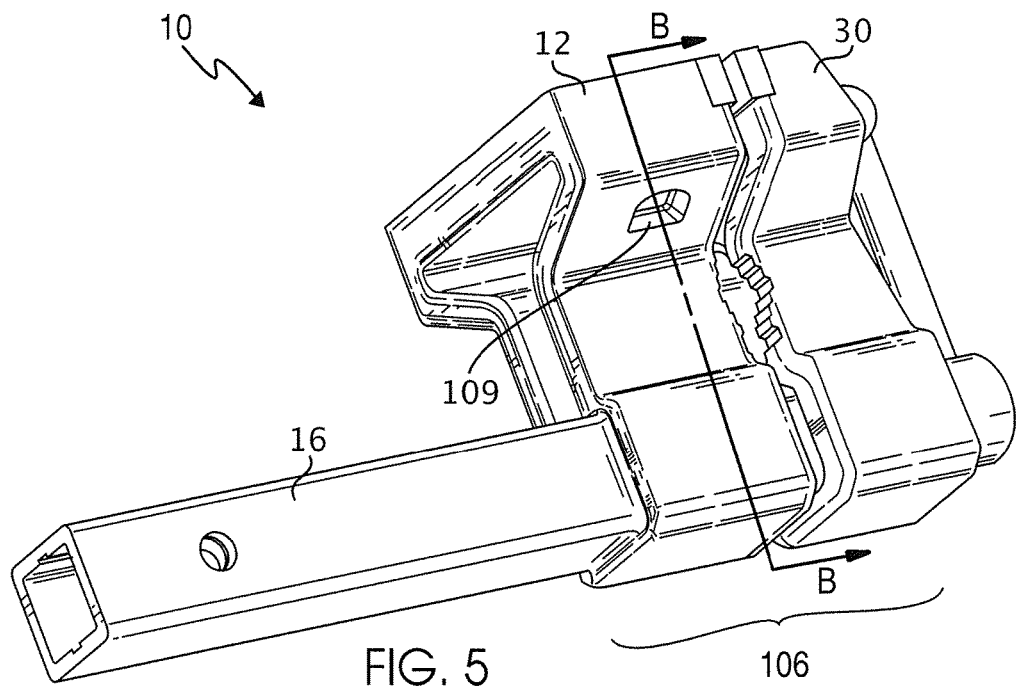
FIG. 5 is a perspective view of the work holding device shown in FIG. 1.
Figure 6:
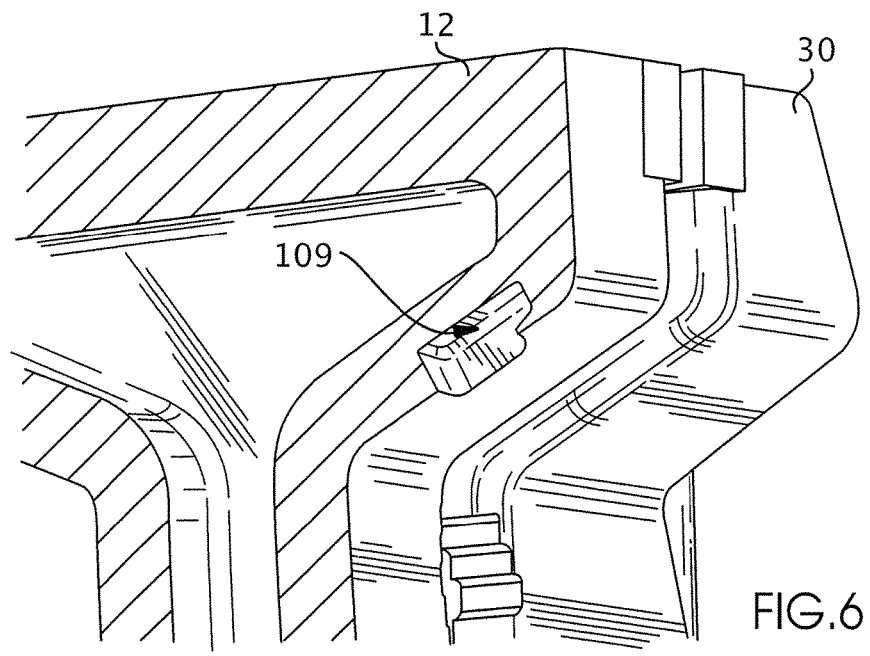
FIG. 6 is a partial cross-section view of the work holding device shown in FIG. 5 along sectional line B-B.

As shown in FIGS. 2 and 5, in one embodiment the first jaw piece 12 defines a cored-out back section 104 that provides a handle feature for easily moving, transporting, and mounting the portable work holding device 10. Further, the cored-out back section 104 reduces the weight of the work holding device 10. A bottom surface 106 of the work holding device 10 can be squared off so the user can place the work holding device 10 upright on a support surface, such as the ground or a floor. Referring to FIGS. 2, 7 and 8, for example, the first jaw piece 12 and/or the second jaw piece 30 has an anvil surface 108 raised above the first jaw piece 12 and the second jaw piece 30 to provide a work surface while mounted to the support. In a certain embodiment, the casting 14 defines a recess forming a bottle opener 109, as shown in FIGS. 5 and 6.

Referring now to FIG. 7, the first connection member 16 can be inserted into a vehicle receiver hitch 110, and a suitable pin (not shown in FIG. 7) is inserted through the aperture 26 and the aligned aperture 72 (shown in FIG. 2) to lock the first jaw piece 12 and the spindle nut 42 to the vehicle receiver hitch 110. In one embodiment, the first connection member 16 is a two-inch generally square tube extending from the casting 14. The two-inch generally square tube is inserted into the vehicle receiver hitch 110, or an optional plate assembly or receiver member for mounting on a workbench as described below in reference to FIGS. 8 and 9. The first connection member of the illustrated embodiment is generally square in that it has somewhat rounded corners. The first connection member may instead be rectangular in cross section or of another shape. In a certain embodiment, a threaded nut is also located on or within the two-inch tube with a hole through which the pin travels to facilitate locking first jaw piece 12 to vehicle receiver hitch 110.

Referring now to FIGS. 8 and 9, a portable work holding device assembly 120 includes the work holding device 10 having the first jaw piece 12 with the elongated first connection member 16 for connecting the work holding device 10 to the support 18, such as a work surface or work bench. A plate assembly 122 includes a member 124 formed by a plurality of walls 126 defining a passage 128 having a complementary cross-section to receive the first connection member 16 to facilitate coupling the work holding device 10 to the support 18. In one embodiment, one or more brackets 130, such as one or more angle iron pieces or another suitable component, is welded to a corresponding wall 126 of the member 124. The bracket 130 defines one or more apertures 132 through a first portion 134 of the bracket 130 to facilitate coupling the work holding device 10 to the support surface 18.

In one embodiment, member 124 is a square tube and bracket 130 includes two 1.25×1.25 angle iron pieces welded to corresponding walls 126 of member 124. The bracket 130 allows for work holding device 10 to be quickly moved from a vehicle receiver hitch 110 to a support 18 simply by pulling the pin, positioning the first connection member 16 within the member 124, and positioning the pin through an aperture 140 defined through the member 124, and the aligned aperture 26 of the first connection member and the aligned aperture 72 of the spindle nut 42. Further, a user has the option to couple the plate assembly 122 to a desired support 18, such as a work bench, and transport work holding device 10 to the worksite to utilize with the vehicle receiver hitch 110.

In one embodiment, a method of assembling a work holding device includes providing a stationary first jaw piece having a casting and an elongated first connection member extending from the casting. The first connection member defines a first passage. An elongated second connection member of a movable second jaw piece is positioned within the first passage to couple the second jaw piece to the first jaw piece. The second connection member defines a second passage in communication with the first passage. A spindle assembly is positioned within the first passage and the second passage to movably couple the second jaw piece to the first jaw piece. In a particular embodiment, positioning the spindle assembly within the first passage and the second passage includes positioning a spindle nut within at least the first passage. The spindle nut forms a helical thread on an inner surface of the spindle nut along at least a portion of a length of the spindle nut between a first end and a second end of the spindle nut. A spindle extends into the second connection member. The spindle forms a helical thread on an outer surface of the spindle along at least a portion of a length of the spindle that cooperates with the helical thread formed on the inner surface of the spindle nut to facilitate translation of the second jaw piece with respect to the first jaw piece along an axis defined by the spindle. The spindle is operatively coupled to the spindle nut. The method further includes providing one or more adjustable projections on the elongated first connection member.

In a further embodiment of the work holding member 150 as shown in FIG. 10, the shaft 152 for holding the work holding member 150 in a receiver of a hitch includes two threaded bores 154 extending through the top surface 156 of the rectangular shaft 152 and two threaded bores 158 extending through a side surface 160 of the rectangular shaft 152. In a preferred embodiment, the two top holes 154 and two side holes 158 are on either side of an opening 162 for receiving a lock pin that holds the work holding member 150 in the hitch receiver. Other embodiments may provide the holes in other locations. It is also envisioned that one hole may be provided on the top and one on the side, or that more than two holes may be provided on the top and more than two provided on the side. The holes may instead be provided on the bottom, or the bottom and top, or on both sides or on just one side. The holes may be provided only on the top, or only on a side, or only on the bottom.

FIG. 11 shows the shaft 152 of the work holding device with set screws 164 threaded into the bores or holes 154 and 158. The set screws 164 of the illustrated embodiment are ⅝ inch diameter set screws having a flat top with a hexagonal recess in the top to receive an Allen wrench. Other set screws are possible, including Phillips head and slotted screws or set screws that accept a star drive or other rotating means. The set screws 164 may extend from the surfaces of the shaft 152 by a varying amount depending on the depth to which they are inserted into the threaded holes 154 and 158. When adjusted to extend beyond the surface of the shaft 152, the set screws bear against the inside of the hitch receiver of the vehicle into which the work holding member or vice is affixed. By adjusting the screws 164 to a bearing position, movement of the work holding member or vice in the hitch receiver is reduced or eliminated. The shaft 152 is held snuggly in the hitch receiver of the vehicle, reducing or eliminating play and/or vibration.

The adjustable set screws 164 permit the work holding device or vice 150 to fit snuggly into different hitch receivers that may have different internal size openings for receiving a hitch, or in this case the hitch mounted vice. By providing two set screws on each of two sides, vibration of the vice during driving can be eliminated by adjustment of the screws. As will be understood by those of skill in this art, the extent to which the set screws project from the shaft 152 is adjusted by the user prior to inserting the shaft 152 into the receiver member of the hitch. If the fit is too snug, the vice is removed from the hitch and the set screws 164 are adjusted further into the shaft 152. If the fit is too loose, the vice is removed from the hitch and the set screws 164 are adjusted to extend further from the shaft 152. The user is thereby able to get a custom, snug fit in the receiver member that may eliminate play and vibration between the hitch and the vice.

The set screws 164 have flat tops to bear against the insides of the hitch receiver when adjusted to extend from the shaft. Other configurations of set screws are also possible, included rounded or projecting top set screws. Other adjustable projections instead of the set screws are also possible, including the possibility of at least one adjustable projection or a plurality of fixed and/or adjustable projections. The projections may be adjusted directly, for example using a tool to adjust each screw, or may be adjusted indirectly.

Figure 12:
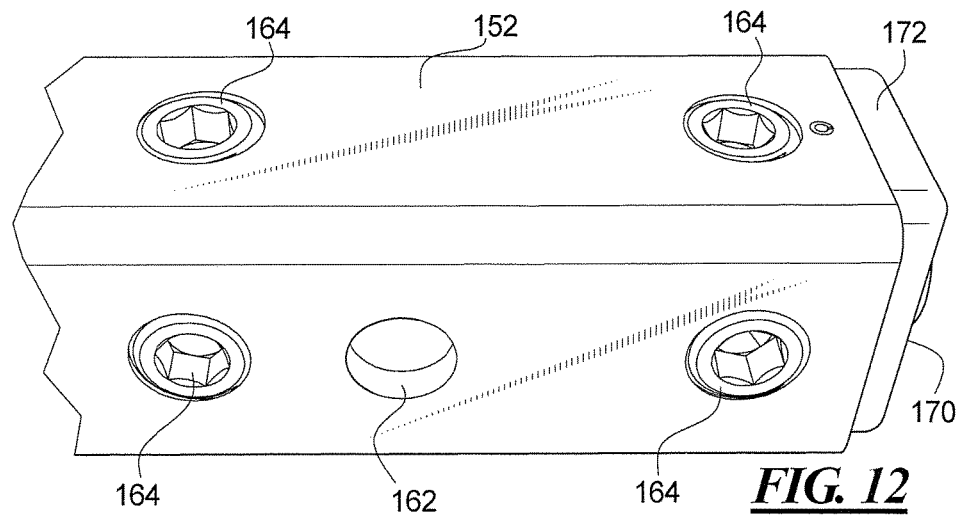
FIG. 12 is an enlarged perspective view of the end of the vice shaft with the set screws adjusted into the shaft.

In FIG. 12, the set screws 164 have been threaded into the holes 154 and 158 so that some are disposed below the surface of the shaft 152 and others extend slightly out of the surface. The set screws 164 may be adjusted to this position for use in a hitch receiver that is of close tolerance fit with the shaft 152. Receiver members of a hitch that has a looser fit would require that the set screws 164 be adjusted to extend further from the shaft 152 to ensure that vibration and movement between the hitch and the vice are reduced or eliminated. The set screws 154 can be a type of screw that prevents movement of the screw in the threads when subject to vibration, such as a screw that has a nylon projection in the thread portion of the screw, or other non-loosening or anti-vibration screw. It is also foreseen that Lock-Tite® or other screw securing material may be used to avoid loosening of the set screws.

Also visible in FIGS. 11 and 12 is an end cap 170. The end cap 170 fits into the open end of the shaft 152 to keep dust, dirt, moisture and other debris out of the interior of the shaft 152 and away from the spindle 52 and other interior workings of the vice. The end cap 170 blocks dirt and debris that may be in or may enter the receiver member of the receiver hitch, for example via an open end of the receiver member. For example, some receiver hitches have both ends of the receiver open so that dirt may enter the forward facing end of the receiver member as the vehicle is driven. The end cap 170 of a preferred embodiment has a stump that fits into the open end of the shaft 152 and a cap portion 172 with an outwardly extending flange that is larger than the interior of the shaft 152 to prevent the end cap 170 from fitting all the way into the shaft. The end cap 170 is preferably of a rubber material, although other materials are also possible. The end cap 170 should have a smaller size than the opening in the hitch receiver so that it fits into the hitch receiver when the vice is mounted in a hitch receiver.

Figure 13:
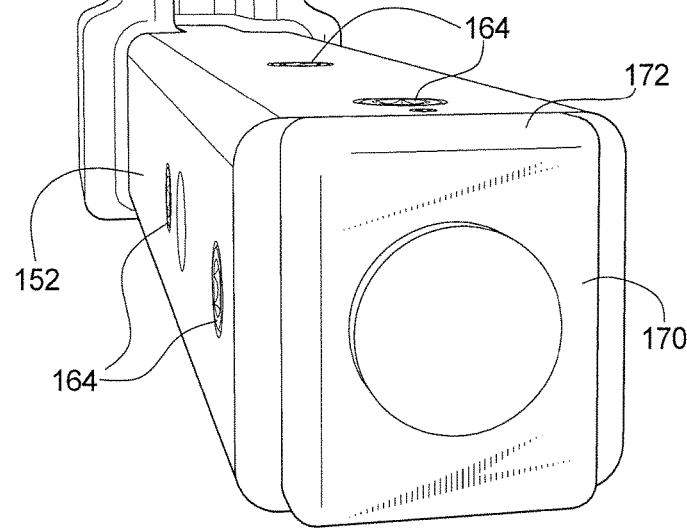
FIG. 13 is an end view of the vice shaft showing an end cap.

FIG. 13 is an end view of the end cap 170 fitted onto the end of the shaft 152. The opening in the shaft is completely covered by the end cap 170. Moisture and dirt is prevented from entering the shaft so that rust is prevented. The spindle and other internal parts of the vice may be kept clean and rust free for improved, long-term operation.

The described assembly, device, and methods are not limited to the specific embodiments described herein. In addition, components of each assembly and/or device, and/or steps of each method may be practiced independent and separate from other components and method steps, respectively, described herein. Each component and method also can be used in combination with other assemblies, devices, and methods.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although other modifications and changes may be suggested by those skilled in the art, it is the intention of the inventors to embody within the patent warranted hereon all changes and modifications as reasonably and properly come within the scope of their contribution to the art.

We claim:

1. A work holding device, comprising:
   a first jaw piece having a first jaw and an elongated connection member, the elongated connection member being constructed and configured for mounting in a receiver member of a vehicle hitch;
   a second jaw piece having a second jaw opposed to the first jaw;
   a spindle assembly movably connecting the second jaw piece to the first jaw piece, the spindle assembly configured to move the second jaw with respect to the first jaw to create a clamping pressure when an object is placed between the first jaw and the second jaw, the spindle assembly at least partially disposed within the elongated connection member;
   a plurality of adjustable projections threadingly engaged with and extending from the elongated connection member, the plurality of adjustable projections being adjustable on the elongated connection member to adjust an extent of projection of the adjustable projection from the elongated connection member and a fit between the adjustable projections and an inside of the receiver member of the vehicle hitch, at least two of the plurality of adjustable projections being separately adjustable from one another to permit each to be adjusted to a different extent of projection from the elongated connection member from the other.

2. A work holding device as claimed in claim 1, wherein the elongated connection member extends along an axis, and wherein the plurality of adjustable projections extend from the elongated connection member transverse to the axis.

3. A work holding device, comprising:
   a first jaw piece having a first jaw and an elongated connection member, the elongated connection member being constructed and configured for mounting in a receiver member of a vehicle hitch;
   a second jaw piece having a second jaw opposed to the first jaw;
   a spindle assembly movably connecting the second jaw piece to the first jaw piece, the spindle assembly configured to move the second jaw with respect to the first jaw to create a clamping pressure when an object is placed between the first jaw and the second jaw, the spindle assembly at least partially disposed within the elongated connection member;
   at least one adjustable projection threadingly engaged with and extending from the elongated connection member, the at least one adjustable projection being adjustable on the elongated connection member to adjust an extent of projection of the adjustable projection member from the elongated connection member and a fit between the at least one adjustable projection and an inside of the receiver member of the vehicle hitch; wherein the at least one adjustable projection includes a threaded set screw received in a threaded bore defined on the elongated connection member, the set screw being selectively adjustable in a direction transverse to a longitudinal extent of the elongated connection member.

4. A work holding device as claimed in claim 3, wherein the at least one adjustable projection includes two threaded set screws received in threaded bores in the elongated connection member, the set screws being selectively adjustable in a direction transverse to a longitudinal extent of the elongated connection member, the set screws being selectively adjustable in a direction generally perpendicular to each other.

5. A work holding device as claimed in claim 3, wherein the elongated connection member includes a transverse bore for receiving a locking pin or bolt, and wherein the at least one adjustable projection includes a first adjustable projection axially spaced from the transverse bore in a first direction and a second adjustable projection axially spaced from the transverse bore in a second direction, wherein the second direction is opposite the first direction.

6. A work holding device as claimed in claim 5, wherein the first adjustable projection includes two first adjustable projections in the elongated connection member in the first axial direction from the transverse bore, the two first adjustable projections being adjustable in generally perpendicular directions to one another, and
wherein the second adjustable projection includes two second adjustable projections in the elongated connection member in the second axial direction from the transverse bore, the two second first adjustable projections being adjustable in generally perpendicular directions to one another.

7. A work holding device as claimed in claim 6, wherein the two first adjustable projections and the two second adjustable projections comprise flat top set screws.

8. A work holding device, comprising:
a first jaw piece having a first jaw and an elongated connection member, the elongated connection member being constructed and configured for mounting an end of the elongated connection member opposite the first jaw in a receiver member of a vehicle hitch, the elongated connection member being fixed to the first jaw;
a second jaw piece having a second jaw opposed to the first jaw;
a spindle assembly movably connecting the second jaw piece to the first jaw piece, the spindle assembly configured to move the second jaw with respect to the first jaw to create a clamping pressure when an object is placed between the first jaw and the second jaw; and
an end cap on the end of the elongated connection member opposite the first jaw, the end cap closing the end of the elongated connection member, wherein the end cap is received within the receiver member of the vehicle hitch when the end of the elongated connection member is mounted in the receiver member of the vehicle hitch;
at least one adjustable projection threadingly engaged with and extending from the elongated connection member, the at least one adjustable projection being adjustable on the elongated connection member to adjust an extent of projection of the adjustable projection from the elongated connection member and a fit between the at least one adjustable projection and an inside of the receiver member of the vehicle hitch.

9. A work piece holding device as claimed in claim 8, wherein the end cap is of a flexible polymeric material.

10. A work piece holding device, comprising:
a first jaw piece having a first jaw and an elongated connection member, the elongated connection member being constructed and configured for mounting an end of the elongated connection member opposite the first jaw in a receiver member of a vehicle hitch;
a second jaw piece having a second jaw opposed to the first jaw;
a spindle assembly movably connecting the second jaw piece to the first jaw piece, the spindle assembly configured to move the second jaw with respect to the first jaw to create a clamping pressure when an object is placed between the first jaw and the second jaw;
at least one adjustable projection threadingly engaged with and extending from the elongated connection member, the at least one adjustable projection being adjustable on the elongated connection member to adjust an extent of projection of the adjustable projection from the elongated connection member and a fit between the at least one adjustable projection and an inside of the receiver member of the vehicle hitch;
a transverse bore for receiving a locking pin, the transverse bore defined in the elongated connection member, and
an end cap on the end of the elongated connection member opposite the first jaw, the end cap closing the end of the elongated connection member, the transverse bore positioned between the end cap and the first jaw;
wherein the elongated connection member includes an interior space into which extends the spindle assembly, and
wherein the end cap closes the interior space.

11. A work piece holding device as claimed in claim 10, wherein the elongated connection member has a generally square cross section with a generally square opening at the end opposite the first jaw, and wherein the end cap is of a generally square shape to close the generally square opening in the elongated connection member.

12. A work piece holding device as claimed in claim 10, further comprising:
at least one adjustable projection extending from the elongated connection member, the at least one adjustable projection being adjustable to adjust an extent of projection of the at least one adjustable projection from the elongated connection member.

13. A work piece holding device, comprising:
a first jaw piece having a first jaw and an elongated connection member, the elongated connection member being constructed and configured for mounting in a receiver member of a vehicle hitch;
a second jaw piece having a second jaw opposed to the first jaw;
a spindle assembly movably connecting the second jaw piece to the first jaw piece, the spindle assembly configured to move the second jaw with respect to the first jaw to create a clamping pressure when an object is placed between the first jaw and the second jaw, the spindle assembly at least partially disposed within the elongated connection member; and
an end cap on an end of the elongated connection member opposite the first jaw, the end cap closing the end of the elongated connection member;
at least one adjustable projection threadingly engaged with and extending from the elongated connection member, the at least one adjustable projection being adjustable to adjust an extent of projection of the at least one adjustable projection member from the elongated connection member and a fit between the at least one adjustable projection and an inside of the receiver member of the vehicle hitch;

wherein the at least one adjustable projection includes two threaded set screws received in threaded bores in the elongated connection member, the set screws being selectively adjustable in a direction transverse to a longitudinal extent of the elongated connection member, the set screws being selectively adjustable in a direction generally perpendicular to each other.

14. A work holding device, comprising:

a first jaw piece having a first jaw and an elongated connection member extending from the first jaw, the elongated connection member being constructed and configured for mounting in a receiver member of a vehicle hitch, the elongated connection member includes a transverse bore for receiving a locking pin or bolt, the elongated connection member has a generally square cross section with a generally square opening at an end of the elongated connection member opposite the first jaw;

a second jaw piece having a second jaw opposed to the first jaw;

a spindle assembly movably connecting the second jaw piece to the first jaw piece, the spindle assembly configured to move the second jaw with respect to the first jaw to create a clamping pressure when an object is placed between the first jaw and the second jaw, the spindle assembly at least partially disposed within the elongated connection member;

a plurality of adjustable projections threadingly engaged with and extending from the elongated connection member, the plurality of adjustable projections being adjustable to adjust an extent of projection of each of the adjustable projections from the elongated connection member and a fit between the adjustable projections and an inside of the receiver member of the vehicle hitch, each of the adjustable projections includes a threaded set screw received in a threaded bore in the elongated connection member, the set screw being selectively adjustable in a direction transverse to a longitudinal extent of the elongated connection member, the plurality of adjustable projections includes a first adjustable projection axially spaced from the transverse bore in a first direction and a second adjustable projection axially spaced from the transverse bore in a second direction, wherein the second direction is opposite the first direction, the first adjustable projection includes two first adjustable projections in the elongated connection member in the first axial direction from the transverse bore, the two first adjustable projections being adjustable in generally perpendicular directions to one another, and the second adjustable projection includes two second adjustable projections in the elongated connection member in the second axial direction from the transverse bore, the two second adjustable projections being adjustable in generally perpendicular directions to one another, the two first adjustable projections and the two second adjustable projections comprise flat top set screws; and an end cap on the end of the elongated connection member opposite the first jaw, the end cap closing the end of the elongated connection member, the elongated connection member includes an interior space into which extends the spindle assembly, the end cap closing the interior space, the end cap being of a generally square shape to close the generally square opening in the elongated connection member, the end cap being of a flexible polymeric material.

\* \* \* \* \*